Patented Feb. 22, 1938

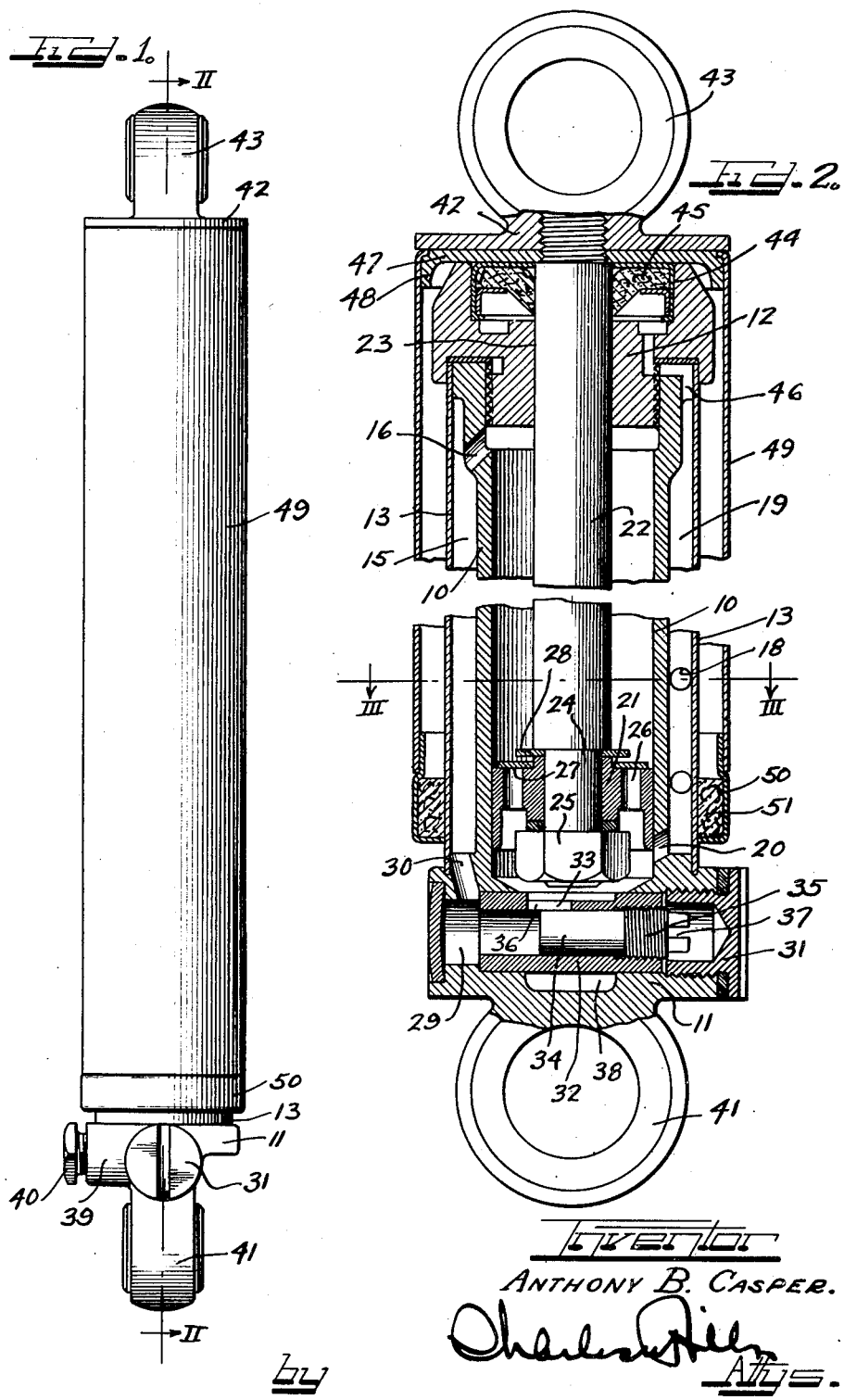

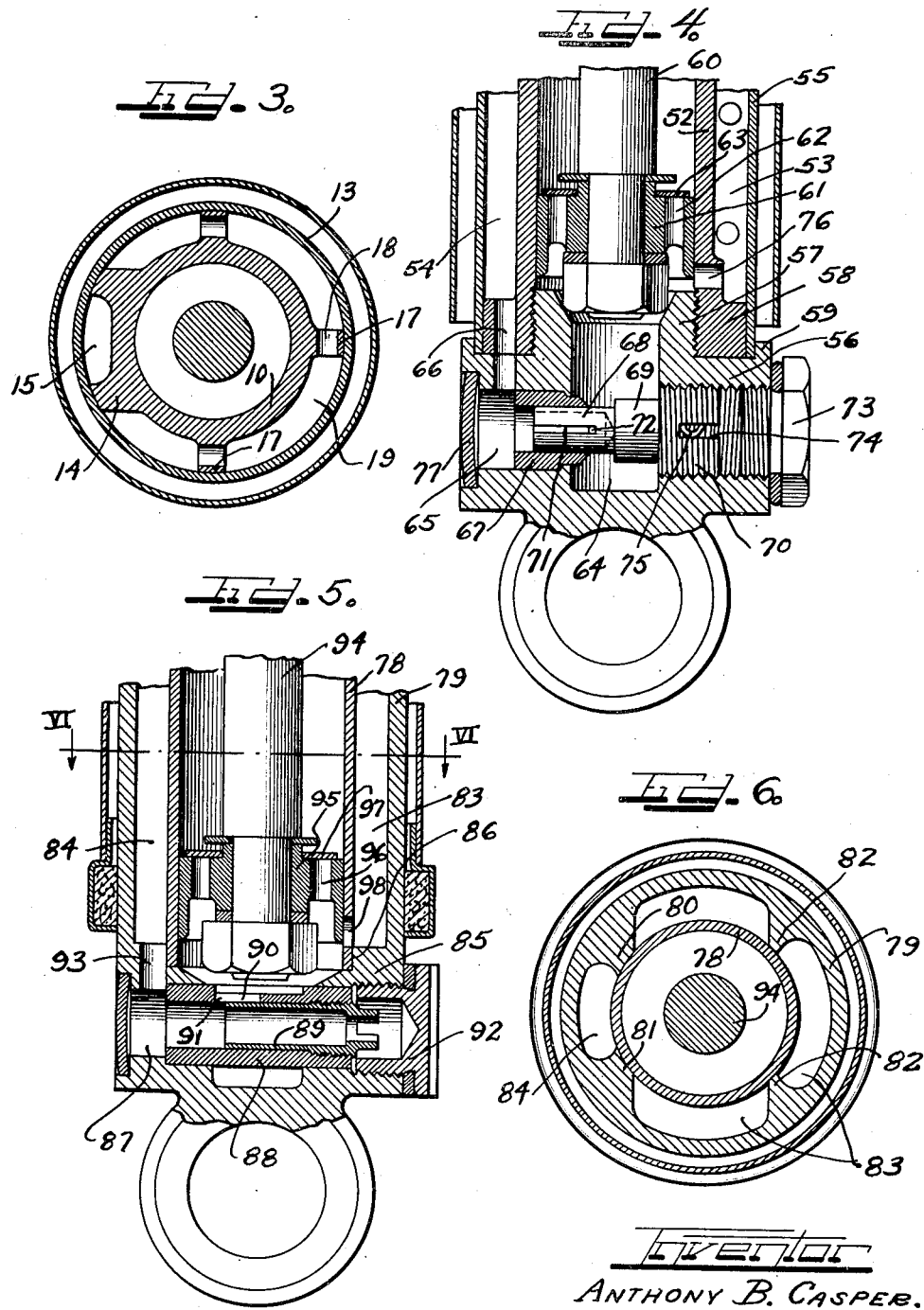

2,108,881

UNITED STATES PATENT OFFICE 2,108,881

HYDRAULIC SHOCK ABSORBER

Anthony B. Casper, Buffalo, N. Y., assignor to Houde Engineering Corporation, Buffalo, N. Y., a corporation of New York Application March 15, 1937, Serial No. 130,848

7 Claims. (Cl. 188—88)

This invention relates to hydraulic shock absorbers, particularly to the direct acting type of shock absorber in which cylinder and piston structure elements move relatively longitudinally for displacement of hydraulic fluid when the shock absorbers are in service.

An important object of the invention is to produce a shock absorber of this type the body structure of which is cylindrical when viewed from the outside but whose cylinder element is in the form of a casting having a cross-sectional shape for cooperation with a surrounding tubular wall to provide fluid reservoir space along one side of the cylinder element and a flow passageway along one side thereof for flow of displaced fluid during rebound stroke of the shock absorber.

A further important object is to provide improved structure and arrangement for valving means for metering the rebound fluid flow and with the valve means readily adjustable from the exterior of the shock absorber for accurate fluid flow metering and control.

The invention also embodies other features of construction and arrangement, all of the features of the invention being embodied in the structure disclosed on the drawings, in which drawings:

Figure 1 is a side elevation of the shock absorber;

Figure 2 is an enlarged sectional view on plane II—II of Figure 1;

Figure 3 is a section on plane III—III of Figure 2;

Figure 4 is a diametral section of the lower end of a shock absorber showing a modified valving arrangement;

Figure 5 is a diametral section of the lower end of a shock absorber showing still another valving arrangement; and Figure 6 is a section on plane VI—VI of Figure 5.

In the shock absorber of Figures 1 to 3, the cylinder structure comprises the cylinder wall 10 having the inner and outer closure heads 11 and 12. The wall 10 and the closure head 11 are preferably part of a single casting and the outer head 12 being a separate casting detachably secured by threaded engagement with the wall 10. Surrounding the wall 10 coaxial therewith and spaced therefrom is a tube 13 seated at its ends in the heads 11 and 12 respectively. The wall 10 has a comparatively wide boss 14 extending longitudinally between the wall 10 and the tube 13 and in its outer side having the channel 15 of which the tube forms the outer wall, this channel being connected at its outer end with the upper end of the cylinder space by a port 16. The wall 10 has other bosses 17 extending longitudinally between the wall and the tube 13, these various bosses holding the tube properly spaced from the wall. The comparatively narrow bosses 17 have passages 18 therethrough for connecting the spaces between these bosses and between the bosses and the wide boss 14, these communicating spaces forming a reservoir 19 for hydraulic fluid, this reservoir space being connected at its inner end with the inner end of the cylinder space by a port 20.

The piston structure comprises a piston 21 and a piston rod 22 extending outwardly through the bore 23 of the outer head 12. The piston receives the reduced end 24 of the piston rod and is clamped thereto by means of a nut 25. The piston has ports 26 therethrough controlled by a valve 27 in the form of an annular plate surrounding the hub of the piston and vertically shiftable thereon, the movement being limited by an abutment plate 28 clamped between the piston and the piston rod.

The inner cylinder head 11 has a cross bore 29 extending diametrally across the inner end of the cylinder, one end of this bore being connected by the passage 30 with the inner end of the channel 15. The other end of the cross bore 29 is closable by a plug 31 having threaded engagement in the bore end. Between the plug and the passage 30, the bore receives a bushing 32 provided with a longitudinally extending slit 33 for communication between the bore 29 and the inner end of the cylinder. Fitting in the bore of the bushing is a cylindrical valve plug 34 threaded at its outer end for engagement with the threaded outer end of the bushing, as indicated at 35, so that when the valve plug is turned its resulting axial movement will cause its inner end to overlap the slit 33 more or less for defining a restricted orifice passage 36 between the end of the valve and the inner end of the slit. Upon removal of the plug 31, the valve plug will be accessible for adjustment, and to facilitate such adjustment the valve plug may be provided at its outer end with a cross slot 37 for receiving a screw driver or other suitable tool by which the valve plug may be readily turned.

The head 11 has the annular channel 38 surrounding the bushing 32, this channel being open to the inner end of the cylinder and the orifice slit 33 communicating with the channel to be thus in communication with the inner end of the cylinder. A boss 39 provides a fluid inlet passage to the channel 38 through which hydraulic fluid may be charged into the cylinder and into the reservoir in order that the cylinder may be at all times filled with fluid and the reservoir may have an ample supply of replenishing fluid. The filler passage is closable by a threaded plug 40.

The head 11 terminates in an eye 41 by which the cylinder structure may be secured to a support such as the axle of an automotive vehicle with whose springs the shock absorber is to be associated. The piston rod has secured to its outer end, preferably by threading, a fitting 42 which has an eye 43 by means of which the piston structure may be secured to a support such as the chassis of the vehicle.

The outer closure head 12 for the cylinder has a recess 44 for receiving suitable packing structure 45 intimately engaging the piston rod to prevent escape of leakage fluid to the exterior of the shock absorber; any fluid which may leak through the piston rod bearing bore 23 being wiped by the packing and retained in the recess 44 for return to the outer end of the reservoir space through a passageway 46.

Clamped to the piston rod by the fitting 42 is a disc 47 having the peripheral flange 48 which receives the outer end of a tubular shield 49 which surrounds the tube 13 and has secured to its inner end an annular housing 50 for containing packing material 51 engaging the tube 13 to act as a shield against the entrance of dust or other foreign matter to the shock absorber working parts, the shield structure acting also as a guide for the piston structure during service of the shock absorber.

Describing the operation, during compression movement of the vehicle spring the piston structure will move the piston toward the inner end of the cylinder, fluid displaced from the inner end of the cylinder lifting the valve 27 and flowing through the piston ports 26 to the outer end of the cylinder. Owing to the volumetric differential at opposite sides of the piston on account of the volume of the piston rod, the outer end of the cylinder cannot accommodate all of the fluid displaced from the inner end of the cylinder and the surplus fluid will therefore flow through the port 20 into the reservoir space 19, and this port may be of a size to afford shock absorbing resistance to the surplus fluid flow.

During rebound movement of the vehicle springs and outward movement of the piston, the valve 27 will close the piston ports 26 so that the fluid displaced from the outer end of the cylinder must flow through the port 16, the channel 15, the passage 30, valve bushing 32, and through the orifice passage 36 into the inner end of the cylinder, the orifice passage metering this flow and determining the shock absorbing resistance thereof. On account of the volumetric differential, suction will be created in the lower end of the cylinder as the piston moves outwardly but this suction is broken by flow of hydraulic fluid from the reservoir through the passage 20 into the inner end of the cylinder, and such fluid flow also replenishes the cylinder with hydraulic fluid. By removing the plug 31, the valve 34 may be readily set for the proper size of the orifice 36 for the desired shock absorber resistance during rebound movement of the vehicle springs. The arrangement is such that the bushing 32 with the valve plug therein may be readily inserted into the bore 29 or withdrawn therefrom. Before the valve structure is inserted, the valve may be adjusted for the desired orifice size, and then if a further adjustment is necessary after the shock absorber is in service position on a car, the plug 31 may be removed and the valve given its final setting.

In the modified arrangement of Figure 4, the cylinder 52 may have the same cross-sectional form as the cylinder structure of Figure 2, and as shown by Figure 3, to provide reservoir space 53 and the rebound fluid flow channel 54 between the cylinder wall and the tube 55. The inner cylinder head 56 is a separate structure and is secured to the inner end of the cylinder by threading engagement of its threaded boss 57 into the cylinder end, the cylinder end having the flange 58 which is received by the inner end of the tube 55, and the head 56 having the annular flange 59 engaging the outer side of the tube.

The piston rod 60 has secured to its inner end the piston 61 having the ports 62 therethrough controlled by the annular disk valve 63.

The cylinder head 56 has the axially extending recess 64 continuing through the boss 58 for communication with the inner end of the cylinder. This axial passage is intersected by the cross bore 65 in the head, the inner end of this bore being in communication with the inner end of the channel 54 by way of the passage 66 extending through the head and the cylinder flange 58. Between the passage 66 and the axial space 64, a seat bushing 67 is mounted in the bore 65 and receives the cylindrical end 68 of a valve plug 69 whose head 70 has threaded engagement in the threaded outer end of the bore 65. The valve end 68 is bored to leave a thin wall which has one or more longitudinal slits 71 surrounded by the bushing 67, the distance of the inner ends of the slits outwardly from the outer edge of the bushing determining the size of metering orifices 72. The outer end of the bushing is preferably bevelled so as to present a sharp edge at the slits in order that the orifices may function as sharp edge orifices for metering the fluid flow substantially independently of viscosity changes in the liquid. The outer end of the bore 65 is closable by a plug 73 where access may be had to the valve for adjustment thereof, the valve head being provided with slots 74 for application of a suitable instrument for turning the valve, and a friction member 75 may be inserted in the slot to frictionally hold the valve in adjusted position.

During compression stroke of the vehicle spring with which the shock absorber is associated, displaced fluid flows from the inner end of the cylinder to the outer end thereof through the piston ports 62, the surplus fluid which cannot be received by the outer end of the cylinder flowing into the reservoir space 53 through the passage 76 provided at the inner end of the cylinder wall 52. During rebound movement of the vehicle spring and outward movement of the piston, the valve 63 closes the ports 62 and the flow will be confined to a path extending from the outer end of the cylinder, through the channel 54, passageway 66, bore 65, the bore of the valve end 68, and through the restricted orifice passage 72 into the space 64 and from there to the inner end of the cylinder, the restricted orifice passage 72 metering this flow for proper shock absorbing action of the shock absorber during vehicle spring rebound movement.

The valve structure can be readily inserted into the head bore 13 through the outer end thereof, and the valve seating bushing 67 may be readily inserted into the bore through the inner end thereof which end is then closed as by means of a plate 77.

In the modified arrangement of Figs. 5 and 6, the cylinder 78 is shown in the form of a tube and is surrounded by a tubular wall 79 having on its inner side the longitudinally extending bosses 80 and 81, and 82, which abut at their inner ends against the cylinder tube so as to provide reservoir space 83 and a fluid channel 84. At its inner end the structure 79 terminates in a head 85 and the structure 79 and the head may be part of an integral casting, the head having a cylindrical recess 86 for receiving the inner end of the cylinder tube 78. The head 85 has the cross bore 87 extending diametrally at the inner end of the cylinder and communicating therewith. Within the bore is the bushing 88 providing a seat for the valve plug 89 which has threaded engagement in the outer end of the bushing. The bushing has a longitudinally extending slit 90 connecting the interior of the bushing with the inner end of the cylinder and this slit is overlapped more or less by the valve plug to define a restricted orifice passage 91 between the inner end of the slit and the inner end of the valve plug. The outer end of the bore 87 is closable by a plug 92 having threaded engagement therein and when the plug is withdrawn the valve may be readily adjusted for the desired size of the orifice passage 91. The inner end of the bore 87 is connected with the channel 84 by a passage 93.

The piston rod 94 carries at its inner end the piston 95 which has the ports 96 therethrough controlled by the annular disk valve 97, the inner end of the cylinder being connected with the reservoir space 83 by a passage 98.

During compression movement of the vehicle spring and inward movement of the piston, the displaced fluid flows from the inner end of the cylinder through the ports 96 to the outer end of the cylinder, surplus fluid flowing into the reservoir space through the passage 98. During rebound movement of the vehicle spring, the fluid displaced from the outer end of the cylinder flows through the channel 84 and passage 93 into the bore 87 and then through the restricted orifice passage 91 into the inner end of the cylinder, the orifice passage metering this flow for the desired shock absorber action.

The valve plug may be hollow, as shown, so that when the plug 92 is removed the shock absorber may be readily filled or replenished with hydraulic fluid.

I have shown practical and efficient embodiments of the various features of my invention but I do not desire to be limited to the exact construction, arrangement and operation shown and described as changes and modifications may readily be made without departing from the scope of the invention.

I claim as follows:

1. In a direct acting shock absorber, a cylinder structure, a piston structure comprising a piston and a rod extending therefrom to the exterior of the cylinder structure, a tubular wall surrounding the cylinder structure, means between said wall and cylinder structure extending longitudinally thereof and defining a reservoir space and a fluid flow channel, means defining a cross passage at the inner end of said cylinder, the inner end of said cross passage being connected with the inner end of said channel and the outer end of said channel being connected with the outer end of the cylinder, and adjustable permanently open valve means in said cross passage for restricting the communication thereof with the inner end of the cylinder and for metering the flow of the fluid displaced from the outer end of said cylinder and through said channel during rebound movement of the vehicle springs with which the shock absorber is associated.

2. In a direct acting hydraulic shock absorber, a cylinder, a tubular wall surrounding said cylinder, means between said wall and cylinder extending longitudinally thereof and defining a reservoir space for hydraulic fluid and a channel for displaced fluid flow, means defining a cross passage at the inner end of said cylinder, said cross passage being connected with the inner end of said channel and the outer end of said channel being connected with the outer end of the cylinder, a bushing within said cross passage having an orifice slit connecting said passage with the inner end of the cylinder, a valve adjustable in said bushing for overlap of said slit to define a restricted orifice passageway for metering the flow of the fluid displaced from the outer end of said cylinder and through said channel to the inner end of the cylinder during rebound movement of the vehicle spring with which the shock absorber is associated.

3. In a direct acting hydraulic shock absorber, a cylinder having a closure head at its inner end provided with a cross bore extending diametrally relative to the cylinder end, a wall surrounding the cylinder coaxial therewith, partitions extending longitudinally between said cylinder and said surrounding wall to define a channel connected at its outer end with the outer end of the cylinder and at its inner end with the inner end of said cross bore, means defining a metering port between said cross bore and the inner end of the cylinder, and a valve adjustable in said cross bore for controlling the size of said port, a piston movable in said cylinder, said port metering the fluid flow by way of said channel from one side of the piston to the other during outward and inward movement of the piston in the cylinder.

4. In a direct acting hydraulic shock absorber, inner and outer closure heads for said cylinder, an outer wall extending between said heads concentric with said cylinder but spaced therefrom, said inner head having a cross bore communicating with the inner end of the cylinder, partition walls extending longitudinally between said cylinder and said outer wall for defining hydraulic fluid reservoir space and a fluid flow channel, means connecting the outer end of said channel with the outer end of the cylinder and means connecting said channel with the inner end of said cross bore, a piston movable in said cylinder and having valving means thereon for controlling the flow of fluid from one side of the piston to the other during inward movement of the piston in the cylinder, and adjustable valve means in said cross bore for metering the fluid flow through said channel from the outer end of the cylinder to the inner end thereof during outward movement of the piston in the cylinder, said reservoir space being connected with the inner end of the cylinder for the flow thereinto of replenishing hydraulic fluid.

5. In a direct acting hydraulic shock absorber, inner and outer coaxial walls spaced apart radially, inner and outer heads closing the ends of said walls, said inner wall forming a cylinder between said heads, a longitudinally extending boss on one of said walls and extending radially between said walls, said boss having a channel therethrough, a cross bore in the inner head, means connecting the outer end of said channel with the outer end of the cylinder and means connecting the inner end thereof with the inner end of said cross bore, a valving assembly within said cross bore for metering the fluid flow by way of said channel from the outer end of the cylinder to the inner end thereof during outward movement of said piston in said cylinder, said piston having ports therethrough and valve mechanism operable to close said ports during outward movement of the piston but to expose said ports during inward movement of the piston in the cylinder, the space between said walls outside of said boss forming hydraulic fluid reservoir space, and a passageway connecting said reservoir space with the inner end of the cylinder.

6. In a direct acting hydraulic shock absorber, inner and outer coaxial walls, inner and outer heads closing the ends of said walls, circumferentially spaced apart partition walls extending longitudinally between said coaxial walls and between said heads, the inner wall of said coaxial walls providing a cylinder, the space between two of said partition walls providing a channel having connection with the cylinder at the opposite ends thereof, the space between the remaining partition walls providing a fluid reservoir having connection with the cylinder at the inner end thereof, a piston structure operable in said cylinder, and a valve assembly for controlling the flow through said channel and from one side of the piston structure to the other during movement of the piston structure in said cylinder.

7. In a direct acting hydraulic shock absorber, inner and outer coaxial walls spaced apart radially, inner and outer heads closing the ends of said wall, said inner wall forming a cylinder between said heads, a piston structure operable within said cylinder, partition walls circumferentially spaced between said coaxial walls and extending longitudinally between said coaxial walls and said heads, the space between two of said partition walls providing a channel having communication with the ends of the cylinder, the space between the remaining partition walls providing a fluid reservoir communicating with the inner end of the cylinder, valve means controlling the flow through said channel from one end of the cylinder to the other during reciprocation of the piston in said cylinder, and valve means on the piston structure controlling the flow from one side of the piston to the other during reciprocation of the piston.

ANTHONY B. CASPER.